United States Patent [19]

Mitchell

[11] 4,394,105
[45] Jul. 19, 1983

[54] TIPPING TRAILER

[76] Inventor: Gordon B. Mitchell, R.D. 3, Hamilton, New Zealand

[21] Appl. No.: 254,011

[22] Filed: Apr. 13, 1981

[51] Int. Cl.³ .............................................. B60P 1/28
[52] U.S. Cl. .................................. 414/436; 414/485; 298/17 SG; 298/24
[58] Field of Search ............... 414/436, 437, 482, 483, 414/420, 425, 469, 474, 475, 477, 485, 486, 435; 298/5, 24, 25, 6, 17 SG

[56] References Cited

U.S. PATENT DOCUMENTS

| 1,047,249 | 12/1912 | Lancaster | 298/25 |
| 1,192,979 | 8/1916 | Blankfort | 298/6 |
| 3,936,070 | 2/1976 | Owings | 298/5 |
| 4,326,827 | 4/1982 | McNutt | 414/436 |

FOREIGN PATENT DOCUMENTS

| 104125 | 9/1950 | New Zealand . |
| 112147 | 7/1954 | New Zealand . |
| 151276 | 1/1969 | New Zealand . |
| 160921 | 7/1970 | New Zealand . |

Primary Examiner—Robert B. Reeves
Assistant Examiner—Donald Hajec
Attorney, Agent, or Firm—Ladas & Parry

[57] ABSTRACT

This invention provides a tipping trailer where the trailer frame is pivotably connected to a hopper for the trailer. Upon release of a lock the hopper may tilt on its pivot with the frame such that a portion thereof makes contact with the surface below and on reversal of the trailer the hopper will tilt and roll back until it is upended.

5 Claims, 11 Drawing Figures

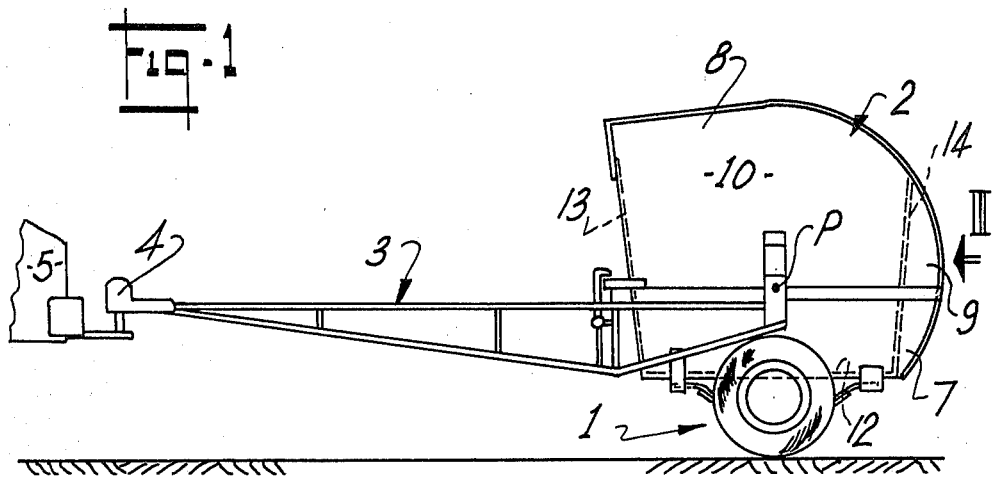
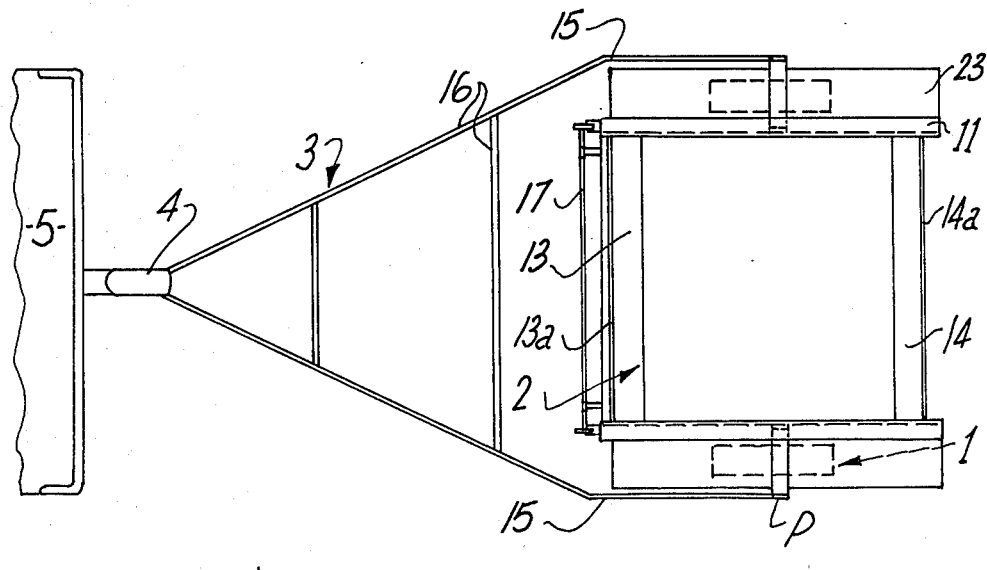

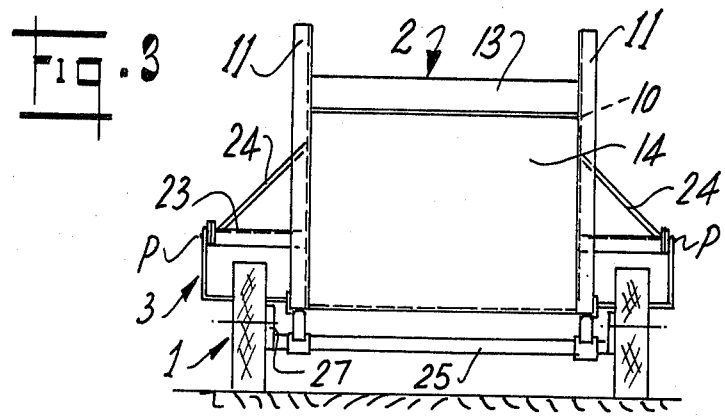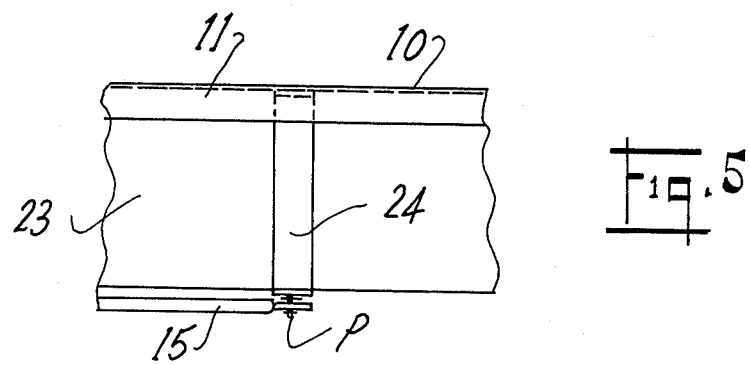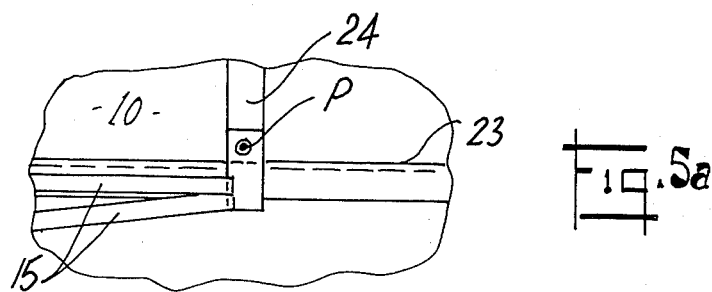

TIPPING TRAILER

DESCRIPTION OF THE INVENTION

This invention relates to tipping trailers.

It is an object of the present invention to provide a tipping trailer the hopper for which is arranged to be pivotable with respect to a frame of the trailer for the purpose of emptying the hopper.

Further objects and advantages of the present invention will become apparent from the ensuing description which is given by way of example.

According to this invention there is provided a tipping trailer comprising at least one set of wheels mounting a hopper, a frame pivotably connected with respect to the hopper said frame having a trailer coupling fixed to or at a leading end thereof by which the trailer can be connected to a towing vehicle and locking means to secure the hopper with respect to the frame during towing, the arrangement being such that upon release of the locking means the hopper may tilt on its pivot with the frame such that a portion thereof makes contact with a surface below and on reversal of the trailer the hopper will tilt on its pivot with the frame and the hopper will roll back until it is up-ended.

Figure 4:
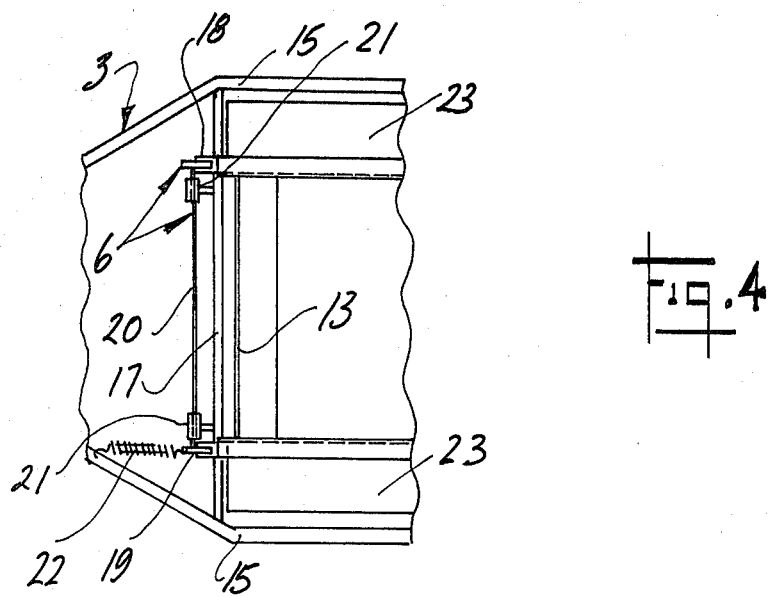
Figure 7:
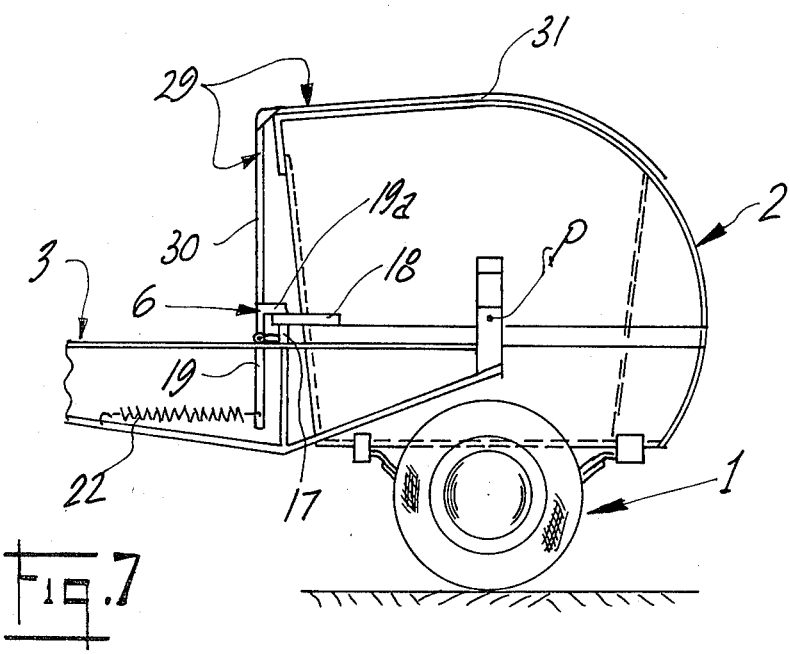

Aspects of the present invention will now be described by way of example with reference to possible embodiments of the present invention illustrated in the accompanying drawings in which:

FIG. 1 is a side view of a tipping trailer in accordance with one possible embodiment of the present invention, and FIG. 2 is a top view of the tipping trailer of FIG. 1, and FIG. 3 is an end view of the tipping trailer of FIG. 1, viewed from the direction of arrow 3, and FIG. 4 is a view of a section of the tipping trailer forward of the hopper illustrating one possible embodiment for a locking means for the tipping trailer, and FIGS. 5 and 5a are top and side views of a section of the tipping trailer illustrating one possible form of pivot connection between the hopper and the frame of the tipping trailer, and FIGS. 6, 6a, 6b and 6c are diagrammatic side views showing how a tipping trailer in accordance with the present invention can be up-ended when a towing vehicle is reversed, and FIG. 7 is a diagrammatic side view of a tipping trailer in accordance with the present invention including a lid.

With reference to the drawings, a tipping trailer in accordance with the present invention comprises at least one set of wheels generally indicated by arrow 1 mounting a hopper generally indicated by arrow 2, a frame generally indicated by arrow 3 which is pivotably connected to the hopper 2, said frame 3 including a trailer coupling 4 fixed to the leading end thereof, such that the trailer can be connected and towed by a towing vehicle 5. Locking means generally indicated by arrow 6 (see FIG. 4) are provided to secure the hopper 2 to its frame 3 during towing and the arrangement being such that upon release of the locking means 6 the hopper 2 may tilt on its pivot P such that a lower end part 7 thereof makes contact with the ground surface below and further upon reversal of the trailer the hopper 2 will tilt and roll back until it is up-ended.

The upper and rear edges 8 and 9 respectively of the sides 10 of the hopper are provided with skids 11 which may be fabricated from a flat steel plate the arrangement being such that when the hopper 2 is released from the frame and makes initial contact with the ground surface below the leading edge 7 of the curved rear edge 9 of the sides 10 of the hopper make contact with the surface below.

The hopper 2 which may be fabricated from a steel plate material comprises a flat base 12 a front wall 13 which may be sloping and a rear wall 14 which is sloped inwardly and downwardly towards the base 12 of the hopper and for convenient access to the hopper the top edge 14a of the rear wall 14 is lower than the top edge 13a of the front wall 13 of the hopper.

In the preferred form of the invention the frame 3 is pivotably connected by pivot connections P at both sides of the hopper 2 and the pivot connections are disposed substantially vertically above the common axis of the set of wheels 1 where a single set of wheels are provided and where two or more sets of wheels (not shown) are used to mount the hopper substantially vertically above an axis common to the two sets of wheels.

The frame 3 comprises a pair of side arms 15 each being pivotably connected at pivot P at the sides of the hopper 2 and a tapered forward portion 16 connected to the side arms to which the coupling 4 is mounted, and the frame 3 can be fabricated from steel tube or bar material. The forward portion 16 of the frame 3 includes a cross brace 17 spanning between the side arms 15 and being positioned immediately forward of the front wall 13 of the hopper 2, said cross-brace mounting the locking means 6 for securing the hopper 2 to the frame 3 during towing the arrangement being such that when the hopper is positioned for towing a pair of rests 18 overlie and rest upon the cross-brace 17. To secure the hopper in its position for towing, and as will be appreciated by those skilled in the art the rests 18 may be locked onto the cross-brace 17 by means such as bolts or by the use of simple latches (not shown). By way of example the locking means 6 may comprise a pair of 'L'-shaped arms 19 mounted on a shaft 20 which is in turn supported from cross-brace 17 by mounting means 21. The upper limb 19a of the arms 19 engage over the ends of rests 18 and the locking means are retained in such position during towing by biasing means such as spring 22. To release the locking means 6 the arms 19 can be retracted against the bias of spring 22 such that the hopper and the rests are free to tilt upwardly and rearwardly with respect to pivot P.

With reference to FIGS. 3, 5 and 5a of the drawings the pivot connections P between the frame 3 and the hopper 2 are fixed at the outer edge of guards 23 of the hopper 2. Each of the guards 23 may be fabricated from a stiff steel material and may be braced with respect to the side walls 10 of the hopper by braces 24.

A wheel assembly for the trailer may comprise a common axle 25 fixed to the hopper 2 by conventionally mounted leaf springs 26 the hubs (not shown) for the wheels being mounted with respect to upwardly extending mounting plates 27 of the axle 25.

Figure 6:
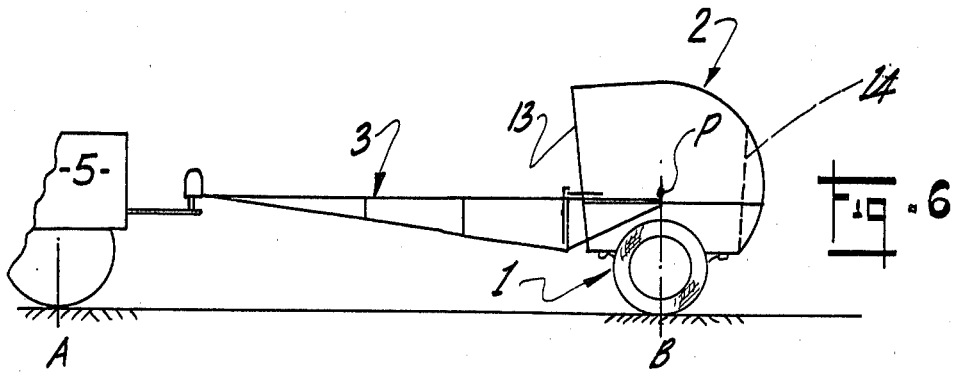
Figure 6A:
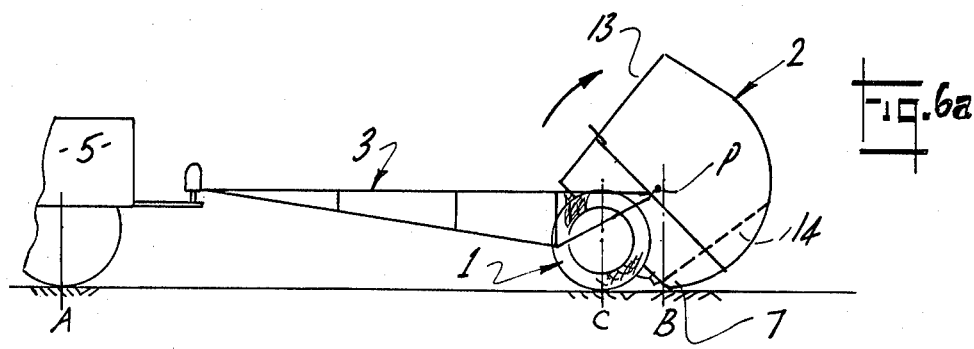
Figure 6B:
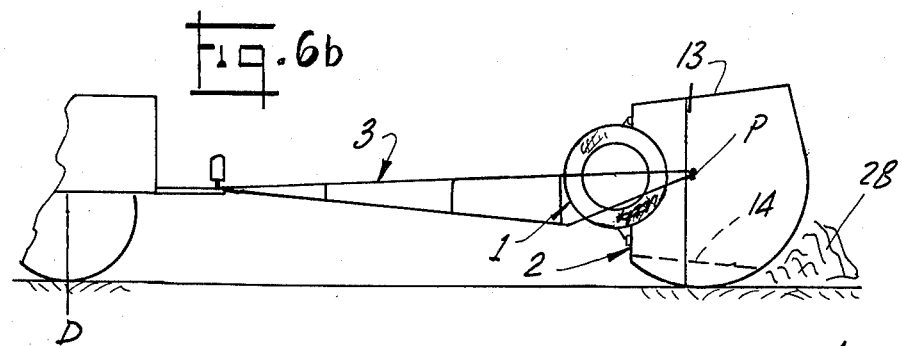
Figure 6C:
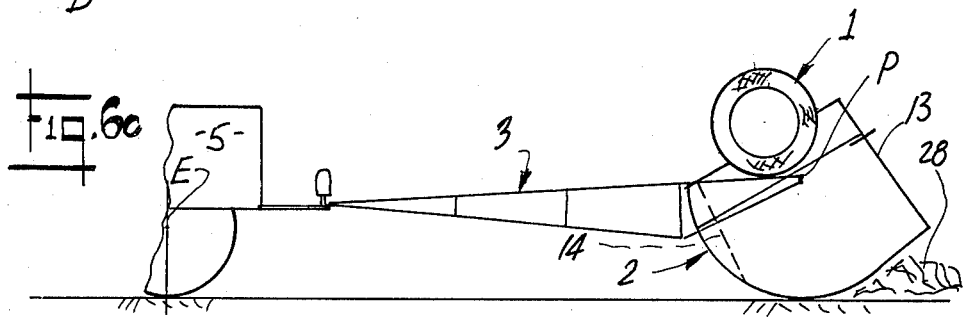

FIGS. 6, 6a, 6b and 6c illustrate the manner in which the tipping trailer can be up-ended when a towing vehicle 5 is reversed. Prior to reversing the trailer and while the trailer is towable the locking means is released as is illustrated by FIG. 6 aforesaid, and the hopper 2 titled on its pivots P such that the lower portions of the rear sides 7 of the hopper make contact with the ground. This is the situation illustrated by FIG. 6a. As the hopper 2 tilts the wheel assembly 1 will move forward slightly from a position B to position C. The towing vehicle may then be reversed from position A to position D whereupon the hopper 2 will continue to roll on its skids and the contents 28 of the hopper will begin to be dispersed on the ground below as is illustrated by FIG. 6b. On further reversing of the towing vehicle 5 to position E the hopper 2 will roll further on its skids and pivoting with respect to frame 3 on pivot connections P until the hopper 2 is entirely up-ended as is illustrated by FIG. 6c. From this position the trailer may then be re-positioned for towing initially as the towing vehicle 5 moves forward and the position illustrated by FIG. 6a is once again reached. Lighter trailers may be normally manouvered to the upright position illustrated by FIG. 6 and locked by the locking means, however for larger trailers it may be necessary to winch the hopper 2 to the towing position by winching means (not shown) associated with the trailer frame 3 or the towing vehicle 5.

Where the tipping trailer is to be used for storing refuse and emptied only as is required or where the trailer is to be used for transporting loose materials it is desirable that a lid be provided to cover the opening therein. A lid may be a simple canvas tarpaulin (not shown) or alternatively fixed lids arranged to be drawn clear of the opening when the trailer is emptied may be provided, and FIG. 7 of the accompanying drawings illustrates a possible form for a tilting lid for the hopper 2. A curved lid indicated by arrow 29 may comprise a pair of supports 30 fixed to shaft 20 (only one being shown) and supporting arcuate fork members 31 may support for example a canvas or metal top (not shown) which covers the opening in the hopper. When it is desired to empty the hopper the lid 29 can be tilted backwards against the bias of spring 22, also releasing the locking means 6, and secured in a laid back position (not shown) by any suitable means and the trailer may then be emptied as described. For larger trailers where loads are particularly heavy the hopper may be provided with a hinged fork or forks (not shown) mounted on the side or sides of the hopper which are directed towards the rear of the trailer. To assist an operator to reach the situation illustrated by FIG. 6a where the hopper is initially tilted and lower end part 7 of the hopper makes contact with the ground, the hinged fork or forks could be released such that their free ends make contact with the ground below. Upon reversing of the trailer the hopper may then be pivoted with respect to the ground below on the lowered forks until the situation of FIG. 6a is reached.

A tipping trailer in accordance with the present invention may be used for transporting many types of materials or articles and for special purposes, such as the mixing of materials the hopper 2 may be provided with mixer blades and driving means (not shown) for this purpose.

It is further envisaged that a tipping trailer in accordance with the present invention may be provided with its own prime mover and steering arrangements especially designed for the purpose of use with the trailer. An engine and steering and other vehicle controls could for example be mounted with respect to forward portions of the frame 3.

Aspects of the present invention have been described by way of example only and it will be appreciated that modifications and additions thereto may be provided without departing from the scope of the present invention as defined in the appended claims.

I claim:

1. A tipping trailer comprising a hopper having a base, side, front and rear walls, a pair of trailer wheels mounted to said base arranged to support the hopper from a ground surface during towing, a frame comprising a pair of substantially parallel side arms each being pivotably connected to the sides of the hopper at a point above the trailer wheels and a forward portion connecting the side arms and having a trailer coupling fixed at or near the leading end thereof by which the trailer can be connected to a towing vehicle, and locking means arranged to secure the hopper with respect to the frame during towing, wherein the side walls of the hopper are a matching pair, each having a first curved edge portion extending from the base forming a pair of skids for the hopper, the arrangement being such that upon release of the locking means the hopper and the trailer wheels may tilt about the pivotal connections between the side arms and the sides of the hopper such that an edge of the skids adjacent the base makes contact with the surface below and on reversal of the trailer the hopper and wheels revolve, the hopper rolls back on the curved skids, and the wheels pass upwards between the side arms whereby the hopper is upended.

2. A tipping trailer as claimed in claim 1 wherein the rear wall of the hopper slopes downwardly and inwardly relative to the base and the top edge of the rear wall of the hopper is lower than the top edge of the front wall of the hopper.

3. A tipping trailer as claimed in claim 1 wherein the forward portion of the hopper is a tapered frame which includes a cross-brace between the side arms positioned immediately forward of the front wall of the hopper, said cross-brace mounting the locking means for securing the hopper to the frame during towing.

4. A tipping trailer as claimed in claim 1 wherein the side walls mount a pair of guards which extend over the wheels of the trailer, each of the guards being pivotably connected to the side arms.

5. A tipping trailer as claimed in claim 1, further comprising a lid for covering an opening in the hopper, said lid comprising a support means pivotably fixed to the frame said support means supporting a pair of arcuate forks arranged to extend over the opening in the hopper, the arrangement being such that the lid is capable of tilting to an open position as the trailer is upended.

* * * * *